(12) United States Patent
Ohta et al.

(10) Patent No.: US 9,014,853 B2
(45) Date of Patent: Apr. 21, 2015

(54) CALIBRATION METHOD AND CALIBRATION SYSTEM FOR ROBOT

(71) Applicant: JTEKT Corporation, Osaka-shi (JP)

(72) Inventors: Hiromichi Ohta, Kariya (JP); Yasuharu Mukai, Kariya (JP); Kazuya Numazaki, Chiryu (JP)

(73) Assignee: JTEKT Corporation, Osaka-shi (JP)

( * ) Notice: Subject to any disclaimer, the term of this patent is extended or adjusted under 35 U.S.C. 154(b) by 113 days.

(21) Appl. No.: 13/785,650

(22) Filed: Mar. 5, 2013

(65) Prior Publication Data
US 2013/0238127 A1     Sep. 12, 2013

(30) Foreign Application Priority Data

Mar. 6, 2012   (JP) ................................. 2012-049329

(51) Int. Cl.
  *B25J 18/00*   (2006.01)
  *B25J 9/16*    (2006.01)
(52) U.S. Cl.
  CPC .............. *B25J 9/1674* (2013.01); *B25J 9/1692* (2013.01); *B25J 9/1682* (2013.01); *Y10S 901/02* (2013.01); *G05B 2219/39049* (2013.01); *G05B 2219/39048* (2013.01); *G05B 2219/39051* (2013.01)
(58) Field of Classification Search
  CPC ................................... B25J 13/06; B25J 15/04
  USPC ........ 700/254, 245, 258, 259; 702/85, 94–96; 318/568.11, 568.16, 568.21, 568.22
  See application file for complete search history.

(56) References Cited

U.S. PATENT DOCUMENTS

| 5,392,384 A | 2/1995 | Tounai et al. |
| 7,756,608 B2 * | 7/2010 | Brogardh ....................... 700/254 |
| 7,979,159 B2 * | 7/2011 | Fixell ............................. 700/251 |

FOREIGN PATENT DOCUMENTS

| DE | 20 2005 007 654 U1 | 10/2005 |
| EP | 0 533 949 A1 | 3/1993 |

(Continued)

OTHER PUBLICATIONS

Extended European Search Report issued Feb. 27, 2014 in Patent Application No. 13157734.8.

(Continued)

*Primary Examiner* — Dalena Tran
(74) *Attorney, Agent, or Firm* — Oblon, McClelland, Maier & Neustadt, L.L.P.

(57) ABSTRACT

A pair of manipulators are caused to take a plurality of attitudes in a state where distal ends of the manipulators are coupled to each other, coordinates of joints between links at each attitude change are acquired on the basis of detection signals, at each attitude change, of rotary encoders provided for servomotors that drive the links of the manipulators, and a position and attitude of an installation point of a slave robot with reference to an installation point of a master robot are calculated on the basis of the joint coordinates acquired at the corresponding attitude change in a forward kinematics manner. A deviation vector for each attitude change between actual measured values of the installation point of the slave robot and the calculated values of the installation point of the slave robot is calculated, and robot constants of both manipulators are identified from the deviation vector.

2 Claims, 3 Drawing Sheets

(56) References Cited

FOREIGN PATENT DOCUMENTS

| | | |
|---|---|---|
| JP | 4-45842 B2 | 7/1992 |
| JP | 05-111897 A | 5/1993 |
| JP | 8-27241 | 1/1996 |
| JP | 2001-50741 | 2/2001 |
| JP | 2008-254097 A | 10/2008 |

OTHER PUBLICATIONS

RobertG. Bonitz, et al., "Calibrating a Multi-manipulator Robotic System" IEEE Robotics & Automation Magazine, vol. 4, No. 1, XP000688537, Mar. 1, 1997, pp. 18-22.

* cited by examiner

CALIBRATION METHOD AND CALIBRATION SYSTEM FOR ROBOT

INCORPORATION BY REFERENCE

The disclosure of Japanese Patent Application No. 2012-049329 filed on Mar. 6, 2012 including the specification, drawings and abstract is incorporated herein by reference in its entirety.

BACKGROUND OF THE INVENTION

1. Field of the Invention

The invention relates to a calibration method and calibration system for a robot.

2. Description of Related Art

A calibration method for mechanism parameters, or the like, of a robot is known as a method described in Japanese Patent Application Publication No. 8-27241 (JP 8-27241 A), Japanese Patent Application Publication No. 2001-50741 (JP 2001-50741 A), or the like. In JP 8-27241 A, a robot is calibrated by a method of collectively calibrating a hand camera and the robot at the same time.

In JP 2001-50741 A, the distal end of a three-dimensional measuring device is coupled to the distal end of an arm of a robot, the position and attitude of the distal end portion of the arm of the robot are measured, and a plurality of teach points are measured while changing the position and attitude of the robot. By so doing, mechanism parameters (also called robot constants) of the robot are obtained, and calibration is performed.

Japanese Patent Publication No. 4-45842 describes a method of changing the attitude of a robot distal end in a state where the robot distal end is engaged with a displacement detector and then performing calibration on the basis of data of joint angles of joints and data of the displacement detector.

JP 8-27241 A to Japanese Patent Publication No. 4-45842 require a hand camera, a three-dimensional measuring device or a displacement detector, so cost increases.

SUMMARY OF THE INVENTION

The invention provides a calibration method and calibration system for a robot, which are able to perform calibration without using a device, such as a three-dimensional measuring device, a displacement detector and a hand camera, by changing attitudes of a pair of manipulators while coupling distal ends of the pair of manipulators to each other.

A first aspect of the invention provides a calibration method for a robot. The calibration method includes: coupling distal ends of a pair of manipulators to each other; setting one of the manipulators as a master robot; setting the other one of the manipulators as a slave robot; causing the master robot and the slave robot to take a plurality of attitudes by outputting commands from a control device to actuators that drive links of the master robot in a state where the master robot and the slave robot are coupled to each other; acquiring coordinates of joints between the links at the time of each attitude change on the basis of position detection signals of position detectors respectively provided for the actuators that drive the links of the master robot and links of the slave robot at the time of each attitude change; calculating a position and attitude of an installation point of the slave robot at the time of each attitude change with reference to an installation point of the master robot on the basis of the coordinates of the joints, which are acquired at the time of the corresponding one of the attitude changes, in a forward kinematics manner; calculating deviations for each attitude change between actual coordinates of the installation point of the slave robot and the calculated coordinates of the installation point of the slave robot; and identifying robot constants of the pair of manipulators from the calculated deviations.

With the above configuration, it is possible to provide the calibration method for a robot, which is able to perform calibration without using a device, such as a three-dimensional measuring device, a displacement detector and a hand camera.

A second aspect of the invention provides a calibration system for a robot. The calibration system includes: a pair of manipulators, each of which includes a plurality of links, actuators that are respectively provided for joints of the links and that drive the links and position detectors that are respectively provided for the actuators, that respectively detect positions of joint axes of the links and that output position detection signals; a control unit that sets one of the manipulators as a master robot, that sets the other one of the manipulators as a slave robot and that causes the master robot and the slave robot to take a plurality of attitudes by outputting commands to the actuators of the master robot in a state where distal ends of the pair of manipulators are coupled to each other; a computing unit that acquires coordinates of the joints between the links at the time of each attitude change of an installation point of the slave robot with respect to an installation point of the master robot on the basis of the position detection signals, and that calculates a position and attitude of the installation point of the slave robot at the time of the corresponding one of the attitude changes on the basis of the coordinates of the joints in a forward kinematics manner; a deviation computing unit that calculates deviations for each attitude change from actual coordinates of the installation point of the slave robot and the calculated coordinates of the installation point of the slave robot; and an identification unit that identifies robot constants of the pair of manipulators from the calculated deviations.

With the above configuration, it is possible to provide the calibration system for a robot, which is able to perform calibration without using a device, such as a three-dimensional measuring device, a displacement detector and a hand camera.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
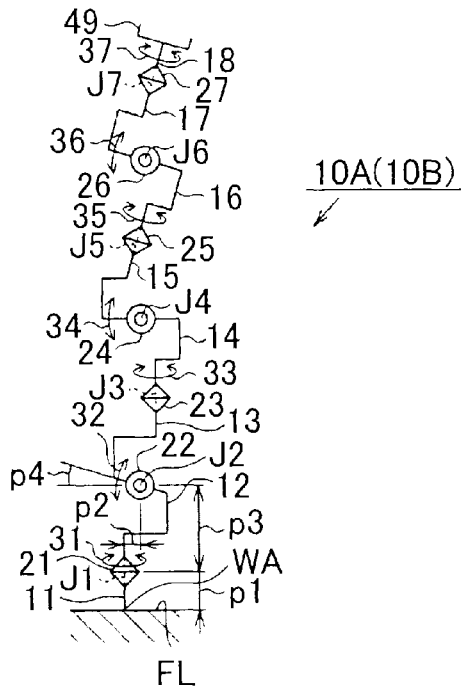
FIG. 1 is a skeletal view of each manipulator according to an embodiment of the invention.

Hereinafter, a calibration method and calibration system for a robot according to an embodiment that is an example of the invention will be described with reference to FIG. 1 to FIG. 5. First, a pair of manipulators 10A and 10B according to the present embodiment will be described. The manipulators 10A and 10B are placed within a range in which it is possible to couple both distal ends of the manipulators 10A and 10B to each other. In the present embodiment, both manipulators 10A and 10B have the same components, so the manipulator 10A will be described. Like reference numerals to those of the components of the manipulator 10A denote the components of the manipulator 10B, and the description thereof is omitted.

As shown in FIG. 1, the manipulator 10A is formed by serially coupling eight links 11 to 18 by seven joints 21 to 27. The manipulator 10A, which is an articulated robot, is a robot that has 7 degrees of freedom (degree of freedom n=7), in which the links 12 to 18 are allowed to turn at the seven joints 21 to 27.

One end of the first link 11 is fixed to a floor surface FL, and the other end of the first link 11 is connected to one side of the first joint 21. One end of the second link 12 is connected to the other side of the first joint 21, and one side of the second joint 22 is connected to the other end of the second link 12. Similarly, the third link 13, the fourth link 14, the fifth link 15, the sixth link 16, the seventh link 17 and the eighth link 18 are respectively coupled sequentially via the third joint 23, the fourth joint 24, the fifth joint 25, the sixth joint 26 and the seventh joint 27.

As shown in FIG. 1, the other side of the first joint 21 is rotatable about an axis extending vertically in FIG. 1 with respect to the one side as indicated by an arrow 31. Thus, the second link 12 is turnable in a direction indicated by the arrow 31 about the rotation axis (J1 axis) of the first joint 21 with respect to the adjacent first link 11.

The other side of the second joint 22 is rotatable about an axis (J2 axis) extending in a direction perpendicular to the sheet in FIG. 1 with respect to the one side as indicated by an arrow 32. Thus, the third link 13 is rotatable in a direction indicated by the arrow 32 about the rotation axis of the second joint 22 with respect to the adjacent second link 12.

The third joint 23, the fourth joint 24, the fifth joint 25, the sixth joint 26 and the seventh joint 27 each are rotatable, and the fourth link 14, the fifth link 15, the sixth link 16, the seventh link 17 and the eighth link 18 are also respectively turnable in directions indicated by arrows 33 to 37 about the rotation axes (J3 axis to J7 axis) of the joints 23 to 27. Note that in the entire specification, the pairs of links 11 to 18 that are coupled via the corresponding joints 21 to 27 are termed mutually adjacent pairs of links 11 to 18. The J1 axis to the J7 axis correspond to joint axes.

Figure 2:
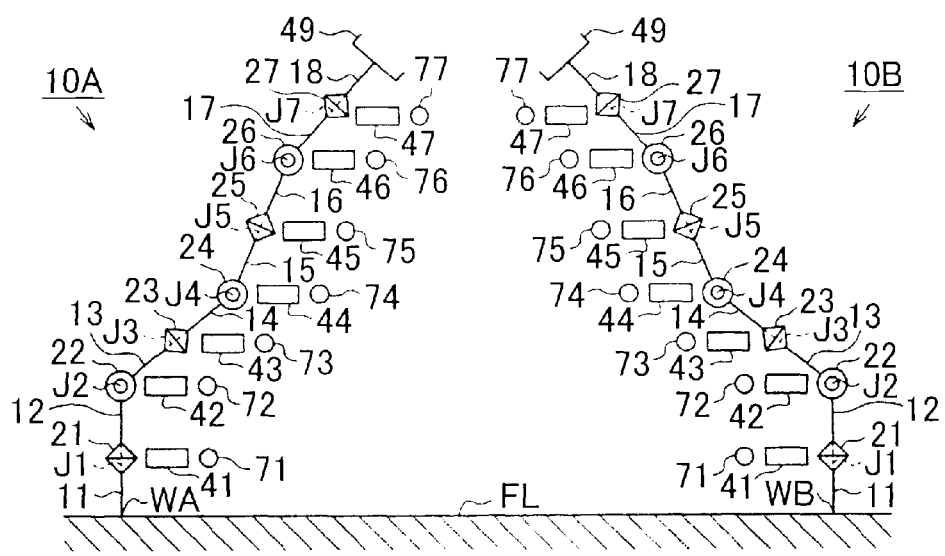
FIG. 2 is a schematic configuration view of manipulators according to the embodiment.

FIG. 2 shows the manipulator 10A in simplified skeletal view as compared with FIG. 1. As shown in the drawing, a first servomotor 41 is installed in the first joint 21. When electric power is supplied to the first servomotor 41, the first servomotor 41 turns the second link 12 with respect to the first link 11.

A second servomotor 42 is installed in the second joint 22. When electric power is supplied to the second servomotor 42, the second servomotor 42 turns the third link 13 with respect to the second link 12. Similarly, servomotors 43 to 47 are respectively installed in the third joint 23, the fourth joint 24, the fifth joint 25, the sixth joint 26 and the seventh joint 27. When electric power is supplied to the servomotors 43 to 47, the servomotors 43 to 47 respectively turn the corresponding links 14 to 18.

The motors are provided in the corresponding joints; however, in FIG. 2, the motors are shown separately from the joints for the sake of convenience of illustration. In the present embodiment, AC motors that serve as the servomotors are used as actuators; however, the actuators are not limited to them.

A tool 49 is mounted at the distal end of the eighth link 18. The tool 49 together with the eighth link 18 is turnable in a direction indicated by an arrow 37 about the rotation axis (J7 axis) of the seventh joint 27 as shown in FIG. 1. The tool 49 is, for example, a hand that is able to grasp a workpiece, or the like. The type of tool 49 does not affect the invention, so it is not limited.

As described above, the manipulator 10A causes an accumulated rotation angle of the second link 12 to eighth link 18 to work on the tool 49 provided at the distal end portion by turning the second link 12 to the eighth link 18 by driving the first servomotor 41 to the seventh servomotor 47, so it is possible to bring the position and attitude of the distal end of the tool 49 into coincidence with a target position and a target attitude appropriate for work of the tool 49.

Figure 3:
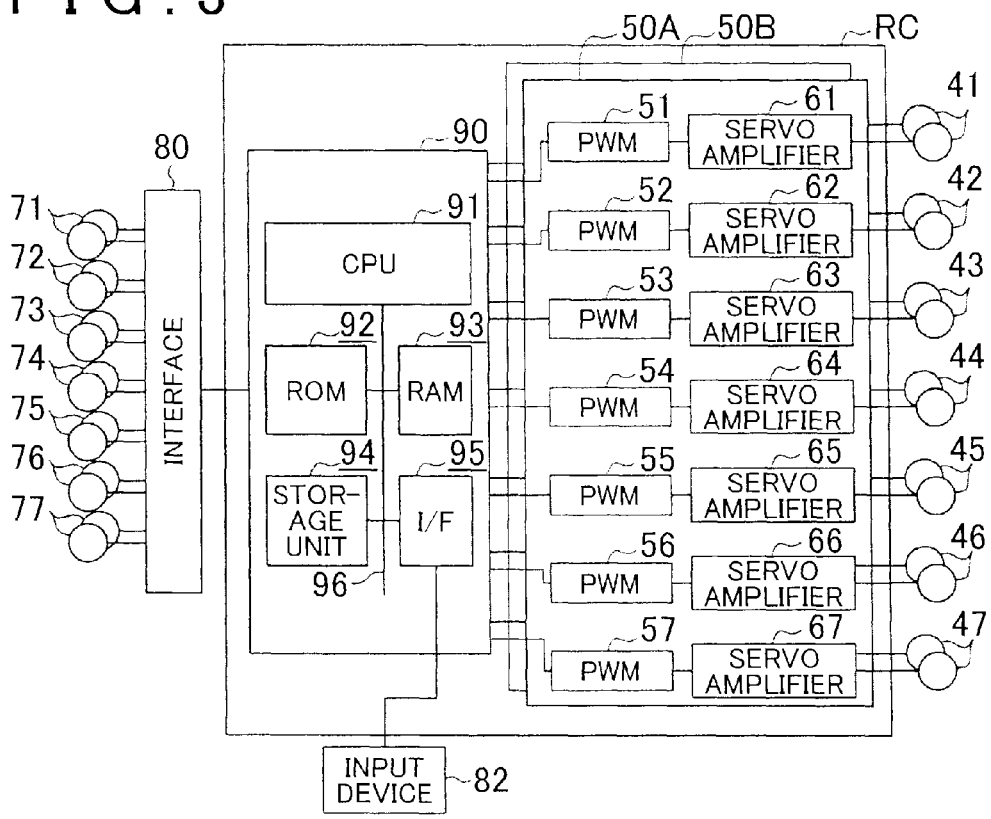
FIG. 3 is a schematic configuration view of a calibration system for a robot according to the embodiment.

Next, the electrical configuration of an articulated robot will be described by focusing on a controller RC that serves as a control unit and a control device that control the manipulators 10A and 10B with reference to FIG. 3.

The controller RC includes a computer 90, PWM generators 51 to 57 for the manipulator 10A, and a motor drive unit 50A. The PWM generators 51 to 57 for the manipulator 10A are electrically connected to the computer 90. The motor drive unit 50A includes servo amplifiers 61 to 67 that are electrically connected to the PWM generators 51 to 57 for the manipulator 10A. The controller RC further includes a motor drive unit 50B.

The motor drive unit 50B, as well as the motor drive unit 50A, includes a plurality of PWM generators (not shown) for the manipulator 10B and servo amplifiers (not shown). The PWM generators (not shown) for the manipulator 10B are electrically connected to the computer 90. The servo amplifiers are electrically connected to the PWM generators (not shown).

The servo amplifiers 61 to 67 of the motor drive unit 50A are respectively electrically connected to the first servomotor 41 to seventh servomotor 47 of the manipulator 10A. In addition, the servo amplifiers (not shown) of the motor drive unit 50B are respectively electrically connected to the first servomotor 41 to seventh servomotor 47 of the manipulator 10B.

The computer 90 outputs joint position command values to the PWM generators 51 to 57 of the motor drive units 50A and 50B. The PWM generators 51 to 57 respectively output PWM signals to the servo amplifiers 61 to 67 on the basis of the joint position command values. The servo amplifiers 61 to 67 respectively turn the links 12 to 18 by actuating the servomotors 41 to 47 on the basis of outputs thereof.

Rotary encoders 71 to 77 are respectively incorporated in the servomotors 41 to 47, and are connected to the computer 90 via an interface 80. The rotary encoders 71 to 77 respectively detect the rotation angles of the servomotors 41 to 47, that is, respectively detect the rotation angles of the links 12 to 18 with respect to the corresponding adjacent links 11 to 17, and transmit the detection signals of the rotation angles, that is, position detection signals, to the controller RC. The rotary encoders 71 to 77 correspond to position detectors. Each of the position detectors is not limited to the rotary encoder. Each of the position detectors may be a resolver or a potentiometer.

Instead of respectively providing the rotary encoders 71 to 77 at the first servomotor 41 to the seventh servomotor 47, sensors that are able to respectively directly detect the rotation angles of the links 12 to 18 may be provided at the links 12 to 18 or the first joint 21 to the seventh joint 27.

The computer 90 includes a CPU 91, a ROM 92, a RAM 93, a nonvolatile storage unit 94, such as a hard disk, an interface 95, and the like, which are electrically connected to one another via a bus 96.

The storage unit 94 stores various data, work programs for causing the robot to carry out various types of work, a calibration program, various parameters, and the like. The ROM 92 stores a system program of an overall system. The RAM 93 is a working memory of the CPU 91, and temporarily stores data when various processings, or the like, are executed. The CPU 91 corresponds to a computing unit, a deviation computing unit and an identification unit.

An input device 82 is connected to the controller RC via the interface 95. The input device 82 is an operating panel that has a monitor screen, various input keys (which are not shown), and the like, and allows a worker to input various data. The input device 82 has a power switch of the articulated robot, and allows to input a final target position and final target attitude of the distal end of the tool 49 mounted at the distal end portion of each of the manipulators 10A and 10B, a position and attitude of the distal end of the tool 49 at an interpolation point to the computer 90 and allows an input for changing the attitude of each of the manipulators 10A and 10B through jog operation, or the like, to the computer 90.

In the present embodiment, brake action on each servomotor may be generated through servo control over the servomotor (servo brake) and may be generated through a mechanical brake (not shown). The brake action that is generated by the mechanical brake on each servomotor is allowed to be subjected to on/off control by operating the input device 82 independently of brake through servo control.

In the present embodiment, the calibration system is formed of the manipulators 10A and 10B, the controller RC and the CPU 91 of the controller RC. The manipulators 10A and 10B each include the first link 11 to the eighth link 18, the first servomotor 41 to the seventh servomotor 47 and the rotary encoders 71 to 77.

Operation of Embodiment

Next, the operation of the calibration method and calibration system for an articulated robot according to the present embodiment will be described.

Figure 4:
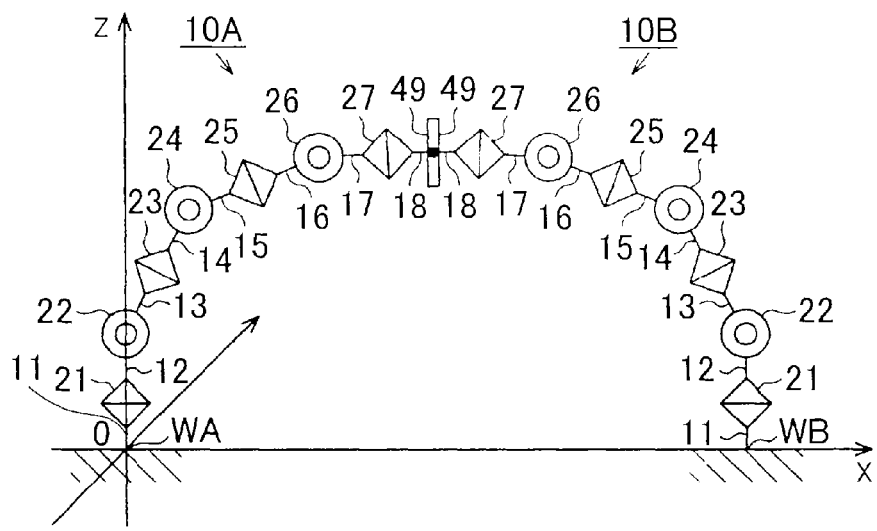
FIG. 4 is a schematic view for illustrating a calibration method for a robot according to the embodiment.
Figure 5:
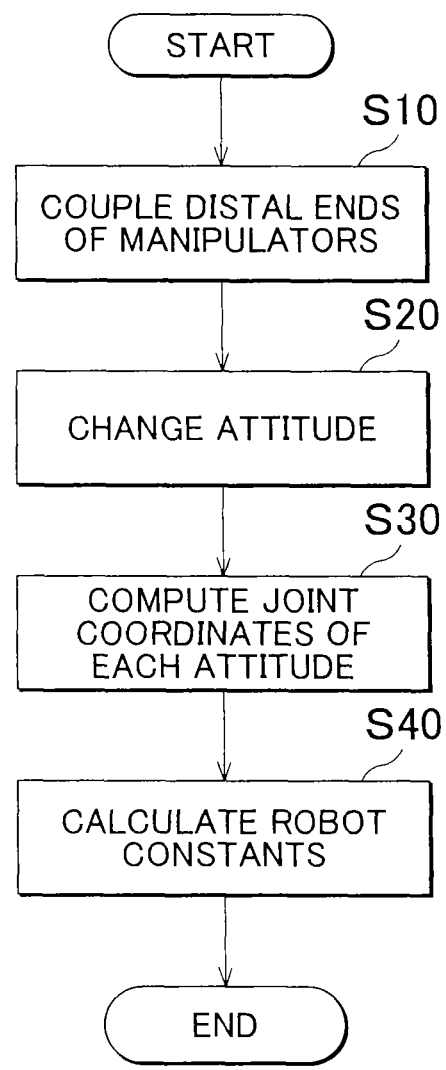
FIG. 5 is a flowchart of the calibration method according to the embodiment.

FIG. 4 is a schematic view that illustrates a calibration method for a robot. FIG. 5 is a flowchart of the calibration method. The worker measures coordinates of an installation point WA of the manipulator 10A and coordinates of an installation point WB of the manipulator 10B in a world coordinate system with the use of a measuring jig, or the like, in advance and stores the coordinates in the storage unit 94 via the input device 82. The coordinates of the installation point WB of the manipulator 10B, which are measured by the worker with the use of a measuring jig, or the like, in the world coordinate system in advance, are termed actual measured values in the following description. Here, the world coordinate system is a three-dimensional coordinate system in the case where a certain place is set as a point of origin in an actual space. In the present embodiment, the world coordinate system is a three-dimensional system that uses the installation point WA between the first link 11 of the manipulator 10A and the floor surface FL as a point of origin.

First, in step 10 (hereinafter, step is abbreviated as "S"), the worker couples both distal ends of the manipulators 10A and 10B, that is, both the tools 49, to each other in a state where the powers of the robots are turned off. A method of coupling both the tools 49 to each other is not limited. For example, both the tools 49 are fastened to each other by a bolt and a nut, or the like.

In S20, the worker turns on the powers (not shown) of the robots, uses the input device 82 to release the mechanical brake (not shown) of the manipulator 10B that serves as a slave robot. Thus, the manipulator 10B is set so as to be able to follow the manipulator 10A. In this state, the worker changes the attitude of the manipulator 10A k times through jog operation of the input device 82. Through the attitude changes, the attitude of the manipulator 10B is also changed. Each time the attitude is changed, the worker operates the input device 82 to cause the CPU 91 to acquire the rotation angles of the joints during the attitude change from the rotary encoders 71 to 77, and store the rotation angles in the storage unit 94.

Attitude change is performed such that the number k of attitude changes satisfies the inequality "6 k≥the total number of robot constants of both manipulators". "6" indicates the number of installation point coordinates X (x, y, z, a, b, c) of the installation point WB. x, y, z denote three-dimensional coordinate values in the world coordinate system, and a, b, c respectively denote the rotation angles (yaw angle, pitch angle, roll angle) around the three-dimensional axes. In the specification, the installation point coordinates are intended to include three-dimensional coordinates and rotation angles around the axes of the three dimension as described above.

In S30, the worker starts up the calibration program by operating the input device 82.

As the program is started up, the CPU 91 computes joint coordinates $\theta 1$ to $\theta m$ (in the present embodiment, m=14) of the joints of each of the manipulator 10A and the manipulator 10B for each attitude change on the basis of the rotation angles of the joints acquired for each attitude change in S20, and stores those calculated results in the storage unit 94.

The joint coordinates of each joint are the coordinate values of the joint between each link and the adjacent link, and are, for example, the coordinate values of the first joint 21, which is the joint between the first link 11 and the second link 12, in the world coordinate system. The CPU 91 acquires the joint coordinates of each of the first joint 21 and the second joint 22 to the seventh joint 27 in the world coordinate system on the basis of the rotation angles acquired from the rotary encoders 71 to 77 of each of the manipulators, and stores the calculated results in the storage unit 94.

In S40, the CPU 91 calculates the robot constants. The robot constants are constants unique to the robot, and typically include link lengths, a position gap (offset) between any adjacent links, a twist, an offset value of the encoder of each joint axis, a warpage of each link, or the like. In FIG. 1, p1 to p4 are illustrated as the robot constants. The robot constant p1 is, for example, the link length of the first link 11, the robot constant p2 is an offset between the first joint 21 and the second joint 22, the robot constant p3 is the link length of the second link 12, and the robot constant p4 is an angle of the third link 13 from a reference plane that passes through the second joint 22. These are illustrative and not restrictive. Robot constants before calibration are stored in the storage unit 94 as defaults in advance.

The following definition applies to the following mathematical expressions that are calculated using the robot constants. The joint coordinates are denoted by $\theta$ ($\theta 1, \theta 2, \ldots, \theta m$). The robot constants are denoted by p (p1, p2, ..., pn). n denotes the total number of the robot constants of the two manipulators.

The installation point coordinates X of the installation point WB of the manipulator 10B may be expressed by the mathematical expression (1).

[Mathematical Expression 1]

$$x = g_x(\theta, p)$$
$$y = g_y(\theta, p)$$
$$z = g_z(\theta, p)$$
$$a = g_a(\theta, p)$$
$$b = g_b(\theta, p) =$$
$$c = g_c(\theta, p). \quad (1)$$

When the mathematical expression (1) is totally differentiated, it may be expressed by the mathematical expression (2).

[Mathematical Expression 2]

$$dx = \frac{\partial g_x(\theta, p)}{\partial p_1} dp_1 + \frac{\partial g_x(\theta, p)}{\partial p_2} dp_2 + \cdots + \frac{\partial g_x(\theta, p)}{\partial p_n} dp_n \quad (2)$$
$$dy = \frac{\partial g_y(\theta, p)}{\partial p_1} dp_1 + \frac{\partial g_y(\theta, p)}{\partial p_2} dp_2 + \cdots + \frac{\partial g_y(\theta, p)}{\partial p_n} dp_n$$
$$\vdots$$
$$dc = \frac{\partial g_c(\theta, p)}{\partial p_1} dp_1 + \frac{\partial g_c(\theta, p)}{\partial p_2} dp_2 + \cdots + \frac{\partial g_c(\theta, p)}{\partial p_n} dp_n$$

dx indicates a difference between an x coordinate that is calculated from the rotation angle acquired from a corresponding one of the rotary encoders and an actual coordinate. This also applies to dy, dz, da, db and dc.

Specifically, the CPU 91 calculates the installation point coordinates X of the installation point WB for each attitude change in a forward kinematics manner (hereinafter, these values are termed calculated values), and computes differences between the calculated values and known coordinates (actual measured values) of the installation point WB of the manipulator 10B. By so doing, the CPU 91 obtains dx, dy, dz, da, db and dc.

Here, when attitude change is performed k times and the above values are measured, 6 k data are obtained. The dX of the manipulator 10B may be expressed by the mathematical expression (3) and the mathematical expression (4).

[Mathematical Expression 3]

$$dX = \begin{bmatrix} dx_{\theta=\theta1} \\ dx_{\theta=\theta2} \\ \vdots \\ dx_{\theta=\theta k} \\ \vdots \\ dc_{\theta=\theta1} \\ dc_{\theta=\theta2} \\ \vdots \\ dc_{\theta=\theta k} \end{bmatrix}, \quad (3)$$

-continued $$J = \begin{bmatrix} \frac{\partial g_x(\theta_1)}{\partial p_1} & \frac{\partial g_x(\theta_1)}{\partial p_2} & \cdots & \frac{\partial g_x(\theta_1)}{\partial p_n} \\ \frac{\partial g_x(\theta_2)}{\partial p_1} & \frac{\partial g_x(\theta_2)}{\partial p_2} & \cdots & \frac{\partial g_x(\theta_2)}{\partial p_n} \\ \vdots & & & \\ \frac{\partial g_x(\theta_k)}{\partial p_1} & \frac{\partial g_x(\theta_k)}{\partial p_2} & \cdots & \frac{\partial g_x(\theta_k)}{\partial p_n} \\ \vdots & & & \\ \frac{\partial g_c(\theta_1)}{\partial p_1} & \frac{\partial g_c(\theta_1)}{\partial p_2} & \cdots & \frac{\partial g_c(\theta_1)}{\partial p_n} \\ \frac{\partial g_c(\theta_2)}{\partial p_1} & \frac{\partial g_c(\theta_2)}{\partial p_2} & \cdots & \frac{\partial g_c(\theta_2)}{\partial p_n} \\ \vdots & & & \\ \frac{\partial g_c(\theta_k)}{\partial p_1} & \frac{\partial g_c(\theta_k)}{\partial p_2} & \cdots & \frac{\partial g_c(\theta_k)}{\partial p_n} \end{bmatrix}, \quad dp = \begin{bmatrix} dp_1 \\ dp_2 \\ \vdots \\ dp_n \end{bmatrix}$$

[Mathematical Expression 4]

$$dX = Jdp \quad (4)$$

In the mathematical expression (3), "θ=θk" (k=1 to 14) suffixed to dx and dc indicates that it relates to the joint coordinates of any one of the first joint 21 to seventh joint 27 of the manipulator 10A and the first joint 21 to seventh joint 27 of the manipulator 10B.

In the mathematical expression (3) and the mathematical expression (4), J is Jacobian matrix, and dp is a deviation vector of the robot constants. Therefore, dp may be expressed by the mathematical expression (5).

[Mathematical Expression 5]

$$dp = (J^T J)^{-1} J^T dX \quad (5)$$

The CPU 91 obtains the deviation vector dp on the basis of the above-described data that are larger in number than the robot constants by applying a method of least squares. That is, the CPU 91 updates the robot constants from the obtained deviation vector of the robot constants and repeatedly makes convergence calculation until the deviation of the installation point WB becomes smaller than or equal to a preset threshold. Thus, the CPU 91 identifies the robot constants.

The present embodiment has the following features.

(1) The calibration method according to the present embodiment couples the distal ends of the manipulators 10A and 10B to each other, sets the manipulator 10A as the master robot, sets the manipulator 10B as the slave robot, and causes the master robot and the slave robot to take a plurality of attitudes by outputting commands from the controller RC (control device) to the servomotors 41 to 47 (actuators) that drive the links of the master robot in a state where the master robot and the slave robot are coupled to each other. The joint coordinates between the links at the time of each attitude change are acquired on the basis of the rotation angles (position detection signals) of the rotary encoders 71 to 77 (position detectors) respectively provided for the servomotors (actuators) that drive the links of the master robot and the links of the slave robot at the time of each attitude change. The position and attitude of the installation point WB of the slave robot at the time of each attitude change with reference to the installation point WA of the master robot are calculated on the basis of the joint coordinates acquired at the time of the corresponding one of the attitude changes in a forward kinematics manner. Furthermore, the deviation vector dp (deviations) for each attitude change between actual coordinates (actual measured values) of the installation point WB of the slave robot and the calculated values of the installation point WB of the slave robot is calculated. The robot constants of the manipulators are identified from the deviation vector dp. As a result, according to the present embodiment, it is possible to perform calibration without using a device, such as a three-dimensional measuring device, a displacement detector and a hand camera. Furthermore, it is possible to identify both the robot constants of the manipulators.

(2) The calibration system according to the present embodiment includes the manipulators 10A and 10B, each of which includes the links 11 to 18, the servomotors 41 to 47 (actuators) provided for the joints of the links, and the rotary encoders 71 to 77 (position detectors) that respectively detect the positions of the J1 axis to J7 axis (joint axes) of the links. In addition, the calibration system includes the controller RC (control unit) that sets the manipulator 10A as the master robot, that sets the manipulator 10B as the slave robot and that causes the master robot and the slave robot to take a plurality of attitudes by outputting commands to the servomotors 41 to 47 (actuators) of the master robot in a state where the distal ends of the manipulators 10A and 10B are coupled to each other.

The calibration system includes the rotary encoders 71 to 77 (position detectors) that are respectively provided for the servomotors (actuators) that drive the links of the master robot and the links of the slave robot at the time of each attitude change. The CPU 91 of the calibration system functions as a computing unit that calculates the position and attitude of the installation point WB of the slave robot at the time of each attitude change on the basis of the coordinates of the joints (joint coordinates) acquired at the time of the corresponding one of the attitude changes with reference to the installation point WA of the master robot in a forward kinematics manner and a deviation computing unit that calculates deviations for each attitude change between the actual coordinates (actual measured values) of the installation point WB of the slave robot and the calculated coordinates values of the installation point of the slave robot. The CPU 91 of the calibration system further functions as an identification unit that identifies the robot constants of each of the manipulators 10A and 10B from the calculated deviations. As a result, according to the present embodiment, it is possible to provide the calibration system for a robot, which is able to perform calibration without using a device, such as a three-dimensional measuring device, a displacement detector and a hand camera, and it is possible to provide the calibration system that is able to identify both the robot constants of the manipulators.

An embodiment of the invention is not limited to the above-described embodiment; it may be modified as follows.

In the above described embodiment, the AC motor that serves as the servomotor is used as each of the actuators; instead, each actuator may be a DC motor, and a stepping motor, or the like, may also be used.

In the above-described embodiment, each link is rotated; instead, a cylinder or a solenoid that serves as an actuator may be used to linearly move the link with respect to the adjacent link. In this case, the position detector may be a linear potentiometer, a gap sensor, such as a capacitance type or an eddy current type, or the like, which detects a linear displacement of the link.

In the above-described embodiment, the invention is implemented in seven-axis articulated robots; however, the invention is not limited to the seven-axis articulated robots. Manipulators having six or less axes or manipulators having eight or more axes may be used instead. Both the manipulators are not always limited to manipulators having the same number of axes. Manipulators having different numbers of axes may be used in combination.

What is claimed is:

1. A calibration method for a robot, comprising:
coupling distal ends of a pair of manipulators to each other;
setting one of the manipulators as a master robot;
setting the other one of the manipulators as a slave robot;
causing the master robot and the slave robot to take a plurality of attitudes by outputting commands from a control device to actuators that drive links of the master robot in a state where the master robot and the slave robot are coupled to each other;
acquiring coordinates of joints between the links at the time of each attitude change on the basis of position detection signals of position detectors respectively provided at the actuators that drive the links of the master robot and links of the slave robot at the time of each attitude change;
calculating, with circuitry, a position and attitude of an installation point of the slave robot at the time of each attitude change with reference to an installation point of the master robot on the basis of the coordinates of the joints, which are acquired at the time of the corresponding one of the attitude changes, in a forward kinematics manner;
calculating with the circuitry, deviations for each attitude change between actual coordinates of the installation point of the slave robot and calculated coordinates of the installation point of the slave robot; and
performing calibration of the robot by identifying robot constants of the pair of manipulators from calculated deviations.

2. A calibration system for a robot, comprising:
a pair of manipulators, each of which includes a plurality of links, actuators that are respectively provided for joints of the links and that drive the links and position detectors that are respectively provided for the actuators, that respectively detect positions of joint axes of the links and that output position detection signals;
a control unit including circuitry configured to set one of the manipulators as a master robot and the other one of the manipulators as a slave robot, the circuitry further configured to cause the master robot and the slave robot to take a plurality of attitudes by outputting commands to the actuators of the master robot in a state where distal ends of the pair of manipulators are coupled to each other;
a computing unit configured to acquire coordinates of the joints between the links at the time of each attitude change of an installation point of the slave robot with respect to an installation point of the master robot on the basis of the position detection signals, the computing unit being configured to calculate a position and an attitude of the installation point of the slave robot at the time of the corresponding one of the attitude changes on the basis of the coordinates of the joints in a forward kinematics manner;
a deviation computing unit configured to calculate deviations for each attitude change from actual coordinates of the installation point of the slave robot and calculated coordinates of the installation point of the slave robot; and
an identification unit configured to perform calibration of the robot by identifying robot constants of the pair of manipulators from calculated deviations.

* * * * *